United States Patent
Taniguchi

[19]

[11] Patent Number: 5,880,361
[45] Date of Patent: Mar. 9, 1999

[54] ABNORMALITY DETECTING APPARATUS FOR AN AIR TEMPERATURE SENSOR

[75] Inventor: Satoru Taniguchi, Anjo, Japan

[73] Assignee: Toyota Jidosha Kabushiki Kaisha, Aichi-Ken, Japan

[21] Appl. No.: 909,906

[22] Filed: Aug. 12, 1997

[30] Foreign Application Priority Data

Aug. 23, 1996 [JP] Japan ................................. 8-222648

[51] Int. Cl.⁶ .................................................. G01M 15/00
[52] U.S. Cl. .................................... 73/118.1; 123/41.01
[58] Field of Search ............................. 73/118.1, 118.2, 73/116, 117.2, 117.3; 123/41.01, 41.05, 41.49

[56] References Cited

U.S. PATENT DOCUMENTS

| | | | |
|---|---|---|---|
| 4,150,562 | 4/1979 | Nielsen | 73/23.32 |
| 4,938,196 | 7/1990 | Hoshi et al. | 73/23.32 |
| 4,949,078 | 8/1990 | Ito et al. | 73/118.1 |
| 5,153,835 | 10/1992 | Hashimoto et al. | 73/117.3 |
| 5,388,454 | 2/1995 | Kuroda et al. | 73/118.1 |
| 5,454,259 | 10/1995 | Ishii et al. | 73/118.1 |
| 5,485,382 | 1/1996 | Seki et al. | 73/118.1 |
| 5,553,489 | 9/1996 | Connell et al. | 73/118.1 |
| 5,561,243 | 10/1996 | Machida | 73/118.1 |
| 5,617,337 | 4/1997 | Eidler et al. | 73/118.1 |

FOREIGN PATENT DOCUMENTS 3-56417  8/1991  Japan .

*Primary Examiner*—Richard Chilcot
*Assistant Examiner*—Eric S. McCall
*Attorney, Agent, or Firm*—Kenyon & Kenyon

[57] ABSTRACT

An abnormality detecting apparatus for an air temperature sensor which can detect an abnormality of the air temperature sensor with high reliability. The determination of abnormality is performed based on a detected temperature of the air temperature sensor when it is determined that the engine is in a sufficiently warmed state and when it is determined that the vehicle is stopped. The determination may be performed based on a temperature detected by the air temperature sensor during a predetermined period after a start of the engine when the start of the engine is detected and when it is determined that the engine is in the sufficiently warmed state. Additionally, the determination may be performed based on a temperature detected by the air temperature sensor after detecting a start of a cooling fan.

16 Claims, 5 Drawing Sheets

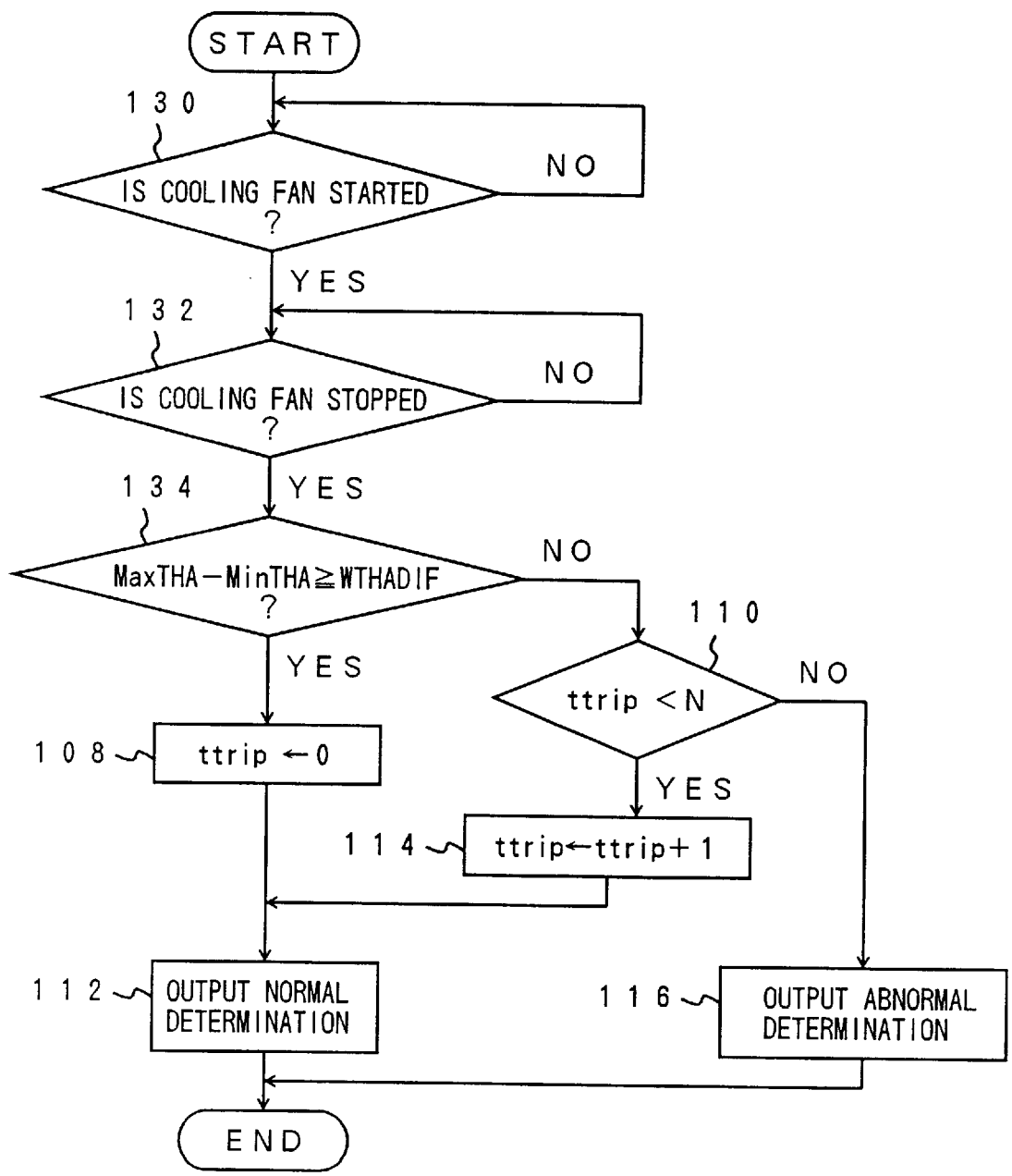

ABNORMALITY DETECTING APPARATUS FOR AN AIR TEMPERATURE SENSOR

BACKGROUND OF THE INVENTION

1. Field of the Invention

The present invention relates to an abnormality detecting apparatus for an air temperature sensor and, more particularly, to a abnormality detecting apparatus for an air temperature sensor which is suitable for detecting an abnormality of a temperature sensor for an intake air of an engine. It should be noted that the air temperature sensor, in addition to an intake air temperature sensor of an engine, could be any air temperature sensor detecting a temperature in an engine compartment such as an air temperature sensor for an automobile air conditioner.

2. Description of the Related Art

In an electronic controlled engine, intake air temperature of an engine is used as one of the parameters which controls the amount of fuel injection. Accordingly, if the detected value of the intake air temperature sensor is inaccurate, the amount of fuel injected is not appropriately controlled. As a result, proper operation of the engine may not be maintained. In order to prevent occurrence of such a condition, it is required to detect occurrence of an abnormality of the intake air sensor with high reliability. As an abnormality detecting method for such, conventionally, a method disclosed in Japanese Patent publication 3-56417 is known. The above-mentioned abnormality detecting method for an air temperature sensor detects an abnormality of the intake temperature sensor based on the detected value of the intake temperature sensor when the engine is completely warmed up.

Generally, in a condition where the engine is completely warmed up, the temperature in the engine compartment is increased, and the intake air temperature of the engine is also increased. Accordingly, if the detected value of the intake air temperature is not increased in the state where the engine is completely warmed up, it can be regarded that an abnormality exists in the intake air temperature sensor. Thus, in the above-mentioned conventional abnormality detecting method, it is determined that the intake air temperature sensor is abnormal if the detected value of the intake air temperature sensor does not exceed a predetermined temperature in the state where the engine is completely warmed up.

When the vehicle is moving, air in the engine compartment is cooled due to air flow entering the engine compartment. Thus, if the vehicle is subjected to against wind when the vehicle is moving, the temperature increase due to radiation of heat from the engine is canceled, and thereby an increase in the intake air temperature of the engine is suppressed. In this case, even when the intake air temperature sensor is normal, the amount of increase in the detected value of the sensor is suppressed by at least a minimal amount.

On the other hand, in the above-mentioned abnormality detecting method for an intake air temperature sensor, a determination of whether or not the vehicle is in a stopped state is not performed. Thus, according to the above-mentioned abnormality detecting method for an intake air temperature sensor, when the determination of an occurrence of an abnormality of the intake air temperature is performed during movement of the vehicle, the detected value of the sensor does not exceed the predetermined value due to the influence of the wind flow due to movement of the vehicle and the against wind even when the engine is in a completely warmed condition. As a result, it is possible that an erroneous determination is made that the intake air temperature sensor is abnormal. In this respect, the above-mentioned abnormality detecting method of the intake air temperature sensor is not always a reliable method.

SUMMARY OF THE INVENTION

It is a general object of the present invention to provide an improved and useful abnormality detecting apparatus for an air temperature sensor in which the above-mentioned problems are eliminated.

A more specific object of the present invention is to provide an abnormality detecting apparatus for an air temperature sensor which can perform a detection of abnormality of an air temperature sensor for detecting temperature of air in an engine compartment in the absence of influence of the movement with a high reliability.

In order to achieve the above-mentioned objects, there is provided according to one aspect of the present invention an abnormality detecting apparatus for detecting an abnormality of an air temperature sensor which detects a temperature of air in an engine compartment of a vehicle, the abnormality detecting apparatus comprising:

warmed state determining means for determining whether an engine in the engine compartment is in a predetermined warmed state;

vehicle stop determining means for determining whether the vehicle is stopped; and sensor abnormality determining means for determining whether the air temperature sensor is abnormal based on a detected temperature of the air temperature sensor, a determination of the sensor abnormality determining means being performed when it is determined by the warmed state determining means that the engine is in the predetermined warmed state and when it is determined by the vehicle stop determining means that the vehicle is stopped.

According to the above-mentioned invention, the sensor abnormality determining means determines whether or not the air temperature sensor is abnormal based on the detected value of the air temperature sensor when the engine is sufficiently warmed and the vehicle is stopped. When the engine is sufficiently warmed, the air in the engine compartment is heated by the heat radiated from the engine. Additionally, when the vehicle is stopped, the air in the engine compartment is not cooled due to air flow generated by movement of the vehicle. Accordingly, when the engine is sufficiently warmed and the vehicle is stopped, the temperature of air in the engine compartment is positively increased. That is, the sensor abnormality determining means performs the determination as to whether or not the air temperature sensor is abnormal when the temperature of the air in the engine compartment is positively increased. Thereby, the determination of abnormality of the air temperature sensor is performed with high reliability.

In one embodiment of the present invention, a determination of the warmed state determining means may be performed based on a temperature of a coolant of the engine.

The warmed state determining means may determine that the engine is in the predetermined warmed state when the temperature of the coolant exceeded a predetermined temperature in a previous operation of the engine and when a present temperature of the coolant is within a predetermined range.

Additionally, the vehicle stop determining means may determine that the vehicle is stopped by the engine being started.

Further, the sensor abnormality determining means may determine that the air temperature sensor is abnormal when a difference between the air temperature detected by the air temperature sensor and a predetermined minimum temperature is less than a predetermined value.

Additionally, the determination of abnormality of the air temperature sensor may be output when the determination that the air temperature sensor is abnormal is made for a predetermined number of consecutive times.

There is provided according to another aspect of the present invention an abnormality detecting apparatus for detecting an abnormality of an air temperature sensor which detects a temperature of air in an engine compartment of a vehicle, the abnormality detecting apparatus comprising:

warmed state determining means for determining whether an engine in the engine compartment is in a predetermined warmed state;

engine start detecting means for detecting a start of the engine; and sensor abnormality determining means for determining whether the air temperature sensor is abnormal based on a temperature detected by the air temperature sensor during a predetermined time period after a start of the engine, a determination of the sensor abnormality determining means being performed when the start of the engine is detected by the engine start detecting means and when it is determined by the warmed state determining means that the engine is in the predetermined warmed state.

According to this invention, the sensor abnormality determining means determines whether or not the air temperature sensor is abnormal based on the detected temperature of the air temperature sensor during the predetermined period after the start of the engine when the engine is started in a sufficiently warmed state. When the engine is sufficiently warmed state, the output of the air temperature sensor is not increased when the engine is started. That is, when the engine is started in the sufficiently warmed state, fresh air is introduced into an air cleaner and an intake pipe of the engine, and the temperature of air entering the engine is decreased. If an air flow enters the engine compartment, the temperature in the air cleaner and the intake pipe is further decreased. Accordingly, during the predetermined period after the engine is started in the sufficiently warmed state, the temperature of air in the air cleaner and the intake pipe of the engine is positively decreased irrespective of whether the vehicle is moving or stopped. That is, the sensor abnormality determining means determines whether or not the air temperature sensor is abnormal based on the detected value of the air temperature sensor in a condition where the temperature of air in the air cleaner and the intake pipe is positively increased. Thereby, the determination of abnormality of the air temperature sensor is performed with high reliability.

In one embodiment of the present invention, the warmed state determining means may determine that the engine is in the predetermined warmed state when the temperature detected by the air temperature sensor is greater than a predetermined temperature.

Additionally, the sensor abnormality determining means may determine that the air temperature sensor is abnormal when a difference between the temperature detected by the air temperature sensor when the engine is started and the temperature at a present time is greater than a predetermined value.

Further, the determination of abnormality of the air temperature sensor may be is output when the determination that the air temperature sensor is abnormal is made for a predetermined number of consecutive times.

Additionally, there is provided according to another aspect of the present invention an abnormality detecting apparatus for detecting an abnormality of an air temperature sensor which detects a temperature of air in an engine compartment of a vehicle, the abnormality detecting apparatus comprising:

cooling fan start detecting means for detecting a start of a cooling fan; and sensor abnormality determining means for determining whether the air temperature sensor is abnormal based on a temperature detected by the air temperature sensor after the start of the cooling fan is detected by the cooling fan start detecting means.

According to this invention, the sensor abnormality determining means determines whether or not the air temperature sensor is abnormal based on the detected value of the air temperature sensor after starting of the cooling fan. When the cooling fan is started, heat accumulated in the radiator is released to the engine compartment. In such a case, if an air flow due to the movement of the vehicle enters the engine compartment, the temperature of air in the engine compartment is positively increased. Accordingly, the sensor abnormality determining means determines whether or not the air temperature sensor is abnormal based on the detected value of the air temperature sensor in a condition where the temperature of air in the engine compartment is positively increased. Thereby, the determination of abnormality of the air temperature sensor is performed with high reliability.

In one embedment of the present invention, a determination of the sensor abnormality determining means may be performed when a predetermined period has passed after the cooling fan is started. The predetermined period may be from a time when the cooling fan is started until a time when the cooling fan is stopped.

Additionally, the sensor abnormality determining means may determine that the air temperature sensor is abnormal when a difference between a maximum temperature detected by the air temperature sensor and a minimum temperature detected by the air temperature sensor is less than a predetermined value. The maximum temperature and the minimum temperature may be detected during a predetermined period from the time when the cooling fan is started until the time when the cooling fan is stopped.

Further, the determination of abnormality of the air temperature sensor may be output when the determination that the air temperature sensor is abnormal is made for a predetermined number of consecutive times.

Other objects, features and advantages of the present invention will become more apparent from the following detailed invention when read in conjunction with the accompanying drawings.

BRIEF DESCRIPTION OF THE DRAWINGS

FIG. 5 is a flowchart of an abnormality determining process executed by a CPU in the third embodiment.

DETAILED DESCRIPTION OF THE PREFERRED EMBODIMENTS

Figure 1:
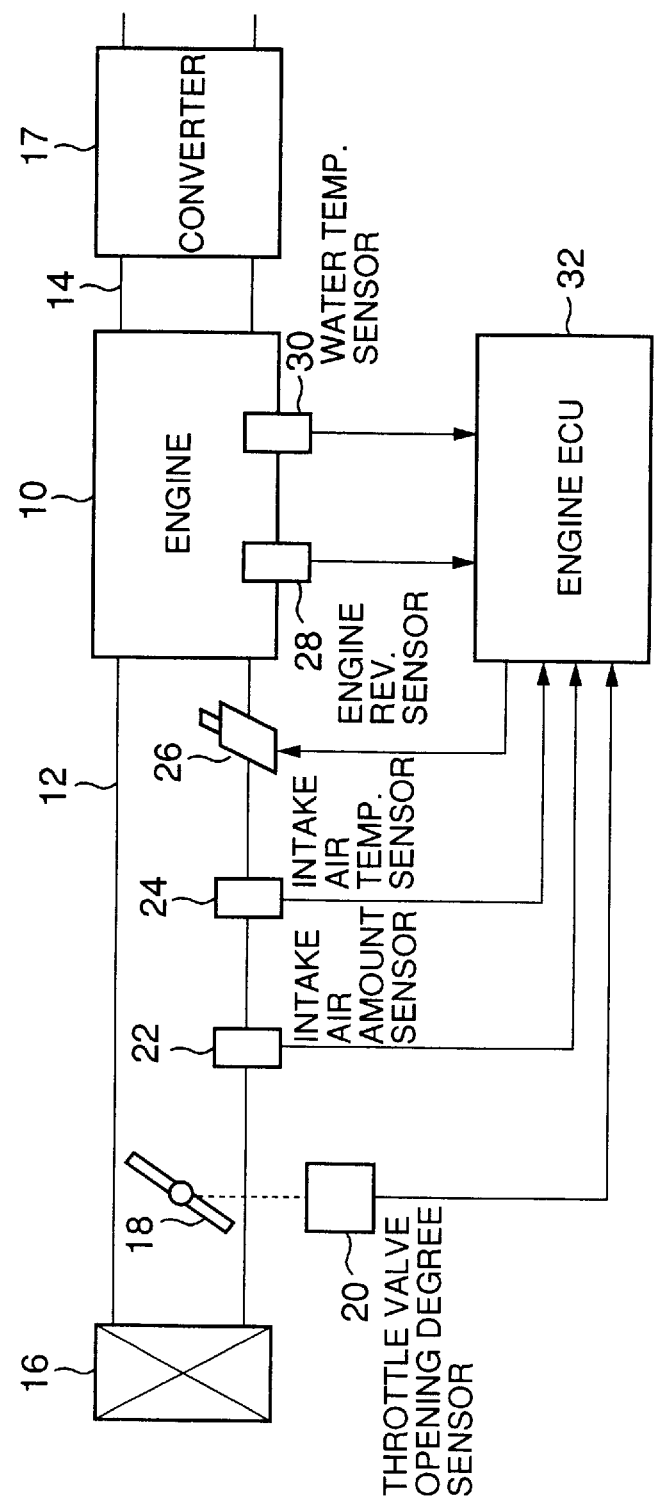
FIG. 1 is a structure diagram of a system according to a first embodiment of the present invention.

FIG. 1 shows a structure diagram of a system according to an embodiment of the present invention. As shown in FIG.

1, the system according to the present embodiment includes an engine 10. The engine 10 is connected to an intake pipe 12 and an exhaust pipe 14. An air filter 16 is provided to an end of the intake pipe 12 on the upstream side. Thus, clean air filtered by the air filter 16 is drawn into the engine 10. Additionally, a catalytic converter 14 is provided to the exhaust pipe 14. The exhaust gas exhaust from the engine 10 is cleaned by the catalytic converter 17, and thereafter the exhaust gas is discharged.

The intake pipe 12 is provided with a throttle valve 18. The amount of intake air is controlled by a degree of opening of the throttle valve 18. A throttle valve opening degree sensor 20 is connected to the throttle valve 18 to detect the degree of opening of the throttle valve 18. Additionally, the intake pipe 12 is provided with, on the downstream side of the throttle valve 18, an intake air amount sensor 22 which detects the amount of intake air of the engine 10, an intake temperature sensor 24 which detects a temperature of the intake air of the engine 10 and an injector 26 which injects fuel within the intake pipe 12. The engine 10 is provided with an engine revolution sensor which detects engine revolution speed and a water temperature sensor 30 which detects a temperature of coolant.

The above-mentioned throttle valve opening degree sensor 20, the intake air quantity sensor 22, the intake temperature sensor 24, the injector 26, the engine revolution sensor 28 and the water temperature sensor 30 are connected to an engine ECU 32.

Figure 2:
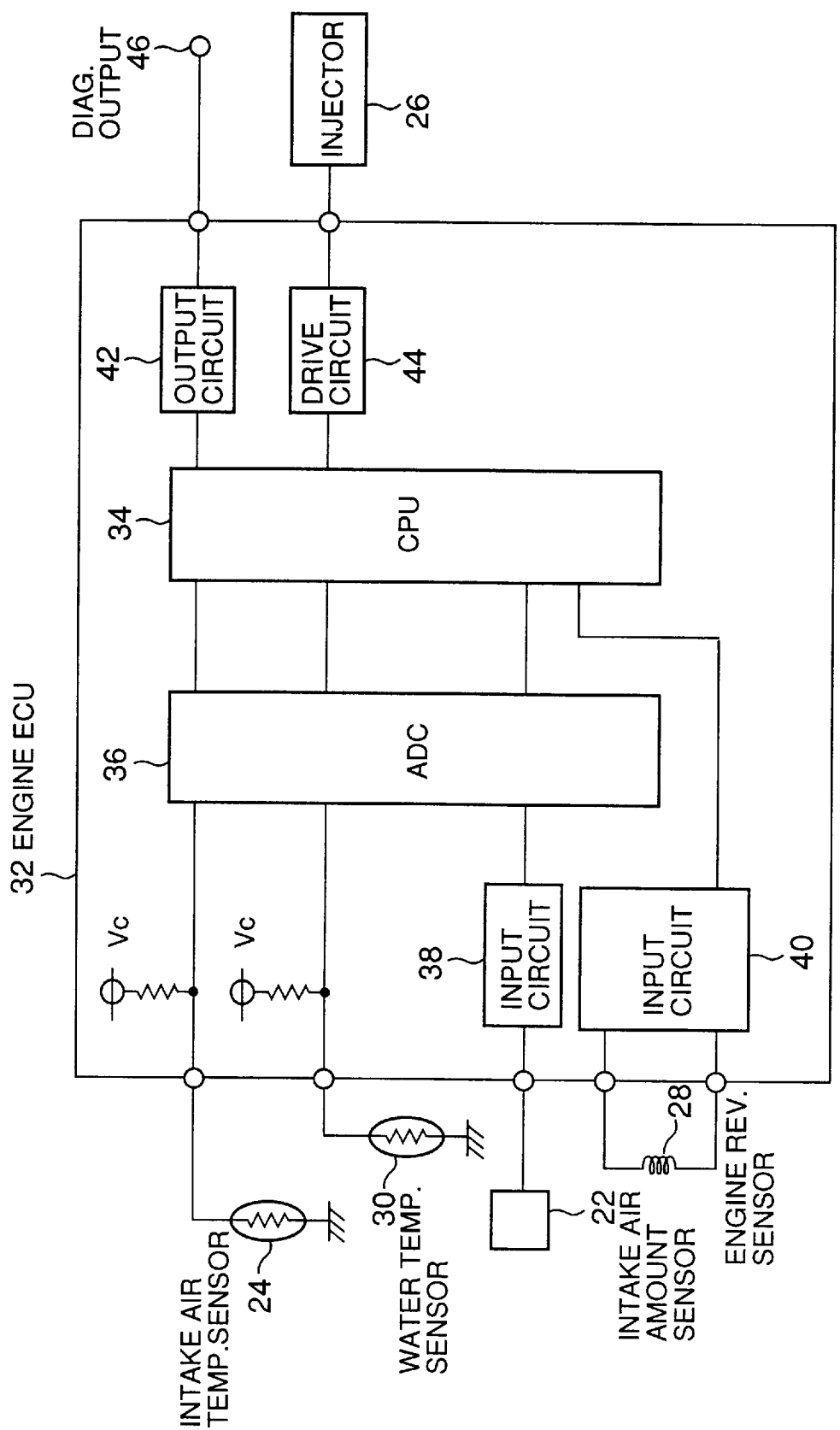
FIG. 2 is a block diagram of an engine ECU shown in FIG. 1.

FIG. 2 shows a system structure diagram of the engine ECU 32. As shown in FIG. 2, the engine ECU 32 comprises a CPU 34, an A/D converter 36, input circuits 38 and 40, an output circuit 42 and a drive circuit 44. The intake temperature sensor 24 and the water temperature sensor 30 are connected to input terminals of the CPU 34 via the A/D converter 36. The intake air quantity sensor 22 is connected to an input terminal of the CPU 34 via the input circuit 38 and the A/D converter 36. The engine revolution sensor 28 is connected to an input terminal of the CPU 34 via the input circuit 40. Additionally, the injector 26 is connected to an output terminal of the CPU 34 via the output circuit 44. The engine ECU 32 controls the amount of fuel injected by the injector 26 based on water temperature THW of the coolant detected by the water temperature sensor 30, a quantity GA of intake air detected by the intake air quantity sensor 22 and revolution speed NE of the engine detected by the engine revolution sensor 28.

The system according to the present embodiment features an engine ECU 32 capable of determining an abnormality of the intake air temperature sensor 24. If the engine ECU 32 determines that the intake air sensor 24 is abnormal, the engine ECU 32 outputs an abnormality determination signal to a diagnosis output terminal 46 via the output circuit 42. When an abnormality is not detected, the engine ECU 32 outputs a normal determination signal. The determination of abnormality of the intake air temperature sensor 24 by the engine ECU 32 is achieved by the CPU 34 of the engine ECU 32 executing a predetermined routine.

Generally, when the engine 10 is restarted when the engine 10 is not sufficiently cooled after it is stopped in a completely warmed state, the temperature in the engine compartment is increased by the radiation heat of the engine 10. Accordingly, the temperature in the intake pipe 12 is sufficiently higher than atmospheric temperature. Thus, in the present embodiment, it is determined that the intake air temperature sensor 24 is abnormal if the intake air temperature THA detected by the intake air temperature sensor 24 is not higher than the atmospheric temperature by more than a predetermined value.

Figure 3:
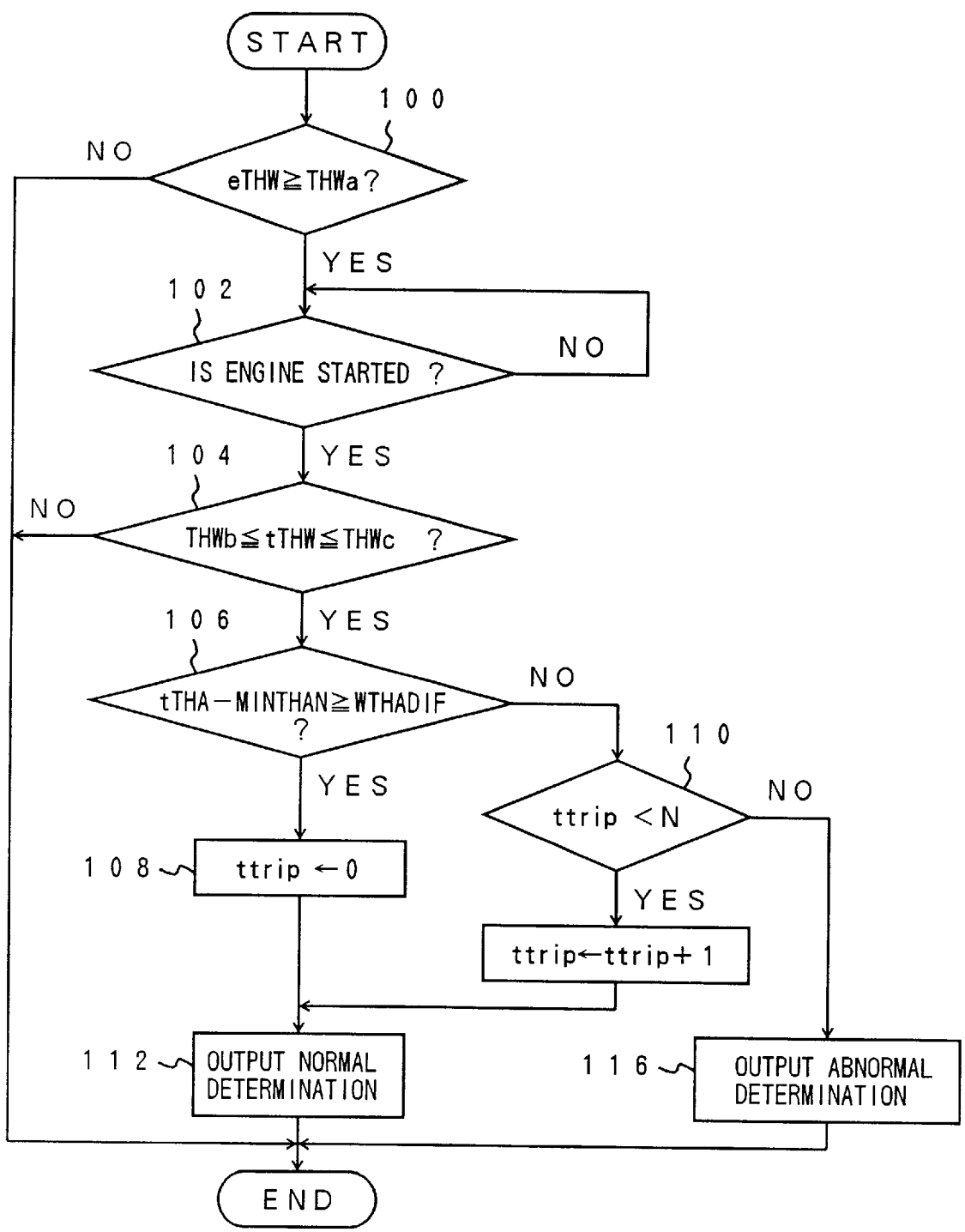
FIG. 3 is a flowchart of an abnormality determining process executed by a CPU in the first embodiment.

A description will now be given, with reference to FIG. 3, of the intake air temperature sensor detecting routine executed by the CPU 34 in the present embodiment. FIG. 3 is a flowchart of the intake air temperature sensor detecting routine executed by the CPU 34 in the present embodiment. The routine is executed immediately after an ignition switch is turned on. When the routine shown in FIG. 3 is started, first it is determined whether or not a relationship eTHW≧THWa exists, the value eTHW is the last value of the water temperature THW from the previous trip. The term "trip" means a time period from the time when the ignition switch is turned on to the time when the ignition switch is turned off. Additionally, THWa is a predetermined threshold value with respect to the water temperature THW which is a reference to determine whether or not the engine 10 is completely warmed. Accordingly, if it is determined, in step 100, that the relationship eTHW≧THWa is established, a determination is made that the engine 10 was stopped after it has been completely warmed in the previous trip. In this case, the process of step 102 is executed next. On the other hand, if it is determined, in step 100, that the relationship eTHW≧THWa is not established, it is determined that the detection of an abnormality of the intake air temperature sensor 24 cannot be performed for the current trip since the engine 10 was stopped before the engine was sufficiently warmed in the previous trip. In this case, the routine is ended without execution of any further process.

It is determined, in step 102, whether or not the engine 10 has been started. This determination can be performed, for example, based on the revolution speed NE of the engine 10. If it is determined, in step 102, that the engine 10 is not started, the process of step 102 is executed again. Accordingly, the process of step 102 is repeated until the engine 10 is started. On the other hand, if it is determined, in step 102, that the engine 10 has been started, the process of step 104 is performed.

In step 104, it is determined whether or not a relationship THWb≦tTHW≦THWc is established with respect to the present value tTHW of the water temperature THW. THWb is a predetermined threshold value with respect to the water temperature THW which is a reference to whether or not the engine 10 is sufficiently cooled. Accordingly, if the relationship THWb≦tTHW is not established, it can be determined that the engine 10 is sufficiently cooled. Additionally, THWc is a predetermined threshold value provided for detecting an abnormality of the water temperature sensor 30. THWc is set, for example, equal to the last water temperature eTHW of the previous trip in step 10. In this case, if the relationship tTHWc≦THWc is not established, this means that the water temperature THW has increased over the last value of the previous trip despite the fact that the engine 10 is in a stopped state. In this case, it can be determined that an abnormality exists in the water temperature sensor 30. Thus, it is determined that determination of a cooling state of the engine 10 based on the above-mentioned detected value of the water temperature sensor 30 is incorrect.

As mentioned above, if it is determined, in step 104, that the relationship THWb≦tTHW≦THWc is not established, a determination is made that determination of an abnormality of the intake air temperature cannot be performed because the engine 10 is sufficiently cooled or the water temperature sensor 30 is abnormal. On the other hand, if it is determined, in step 104, that the relationship THWb≦tTHW≦THWc is established, it can be determined that the engine 10 has not been sufficiently cooled yet. In this case, the air in the engine compartment is sufficiently heated due to radiated heat from the engine 10. Thus, it is determined that intake air temperature THA is increased, and the process of step 106 is then executed.

In step 106, it is determined whether or not a relationship (tTHA-MINTHAN)≧WTHADIF. MINTHAN is a predetermined threshold value, for example, an assumed value of the atmospheric temperature, which is a reference as to whether or not THA is increased. The assumed value of the atmospheric temperature can be obtained based on, for example, the minimum value of the intake air temperature THA in the past, or the value of THA when the quantity GA of the intake air was maximum in the past. Additionally, the value WTHADIF is a predetermined reference value as to whether or not a substantial change is generated in the detected value THA of the intake air temperature sensor 24. The value WTHADIF is set by considering tolerances of measurements of the intake air temperature sensor 24.

Accordingly, if it is determined, in step 106, that the relationship (tTHA-MINTHAN)≧WTHADIF is established, this means that an increase in the temperature of the intake air due to the radiated heat of the engine 10 is detected. Thus, in this case, it is determined that the intake air temperature sensor 30 is normal, and the process of step 108 is executed. On the other hand, if it is determined, in step 106, that the relationship (tTHA-MINTHAN) ≧WTHADIF is not established, this means that the increase in the intake air temperature is not detected by the intake air temperature sensor 24 despite the fact that an increase in the temperature of the intake air due to the radiated heat of the engine 10 is detected. Thus, in this case, it is determined that an abnormality is occurring in the intake air temperature sensor 30 (hereinafter this determination is referred to as a temporary abnormal determination), and the process of step 108 is executed.

In step 108, "0" is substituted for a parameter ttrip which represents the number of consecutive trips in which the temporary abnormal determinations were made. When the process of step 108 is completed, a normal determination signal is output in step 112, and then the routine is ended.

It is determined, in step 110, whether or not a relationship ttrip<N is established. If it is determined, in step 110, that the relationship ttrip<N is established, the number of trips in which the consecutive abnormal determinations were made is less than the number N. Thus, is determined that a determination cannot be made that the intake air temperature sensor 24 is abnormal. In this case, the value of ttrip is incremented in step 114, and the normal determination signal is output in step 112. Then, the routine is ended. On the other hand, if it is determined, in step 110, that ttrip<N is not established, it is determined that the temporary abnormal determinations were made for consecutive N trips. Thus, it can be determined that the intake air temperature sensor 24 is abnormal. In this case, the abnormal determination signal is output in step 116, and then the routine is ended.

It should be noted that, the air in the engine compartment is cooled when the bonnet or hood is open or when an air flow enters the engine compartment due to a strong wind while the engine is stopped after the engine 10 has been completely warmed and then stopped. In this case, it is possible that a negative determination is made in step 106 despite that fact that the temperature of the intake air is decreased and the intake air temperature sensor 24 is normal. Thus, in the present embodiment, if the negative determination is made in step 106, the temporary abnormal determination is made as mentioned above so that the intake air temperature sensor 24 is determined to be abnormal only when the temporary abnormal determinations are made for consecutive N trips. Generally, cooling effects due to opening the bonnet or blowing of strong wind into the engine compartment does not occur frequently. Thus, it is a rare case that the temporary abnormal determinations are made consecutively. Accordingly, by performing the abnormal determination as mentioned above, an erroneous detection of abnormality of the intake air temperature sensor 24 due to opening of the bonnet or an influence of a strong wind can be eliminated.

Additionally, since it is possible that the intake air temperature THA does not increase despite the fact that the engine compartment is cooled and the engine 10 is in the completely warmed state since air flow due to movement of the vehicle enters the engine compartment. Accordingly, if the determination of abnormality of the intake air temperature sensor 24 is performed on the assumption that the engine compartment is heated by radiated heat when the engine 10 is in the completely warmed state and, thus, the temperature of the intake air is increased, it is possible that an erroneous determination is made, when the determination is performed while the vehicle is moving, that the intake air temperature sensor 24 is abnormal despite the fact that the intake air temperature sensor 24 is normal.

However, in the present embodiment, the abnormal determination is made in steps 104 and 106 immediately after it is determined, in step 102, that the engine 10 is started. Generally, immediately after the start of the engine 10, it can be assumed that the vehicle has been parked. Accordingly, in the present embodiment, the process of determining abnormality of the intake air temperature sensor 24 is performed while the vehicle is stopped. As mentioned above, in the present embodiment, an erroneous determination of abnormality due to air flow resulting from movement of the vehicle is prevented by the determination of abnormality of the intake air temperature sensor 24 being performed while the vehicle is stopped. Thus, in the system according to the present embodiment, the detection of abnormality of the intake air temperature sensor 24 can be performed with a high reliability without influence of air flow due to movement of the vehicle.

It should be noted that, in the present embodiment, the determination is made that the vehicle is stopped when the start of the engine is detected in step 102. However, the present invention is not limited to this method, and the determination of the stopped state may be made based on vehicle speed detected by a vehicle speed sensor.

Additionally, in the present embodiment, although the determination of abnormality of the intake air temperature sensor 24 is performed immediately after the start of the engine 10, the determination of abnormality may be performed a predetermined time period after the start of the engine 10. In such a case, the engine 10 is also completely warm, and an accurate determination of abnormality of the intake air temperature sensor 24 can be performed by whether the detected value of the intake air temperature sensor 24 is increased.

It should be noted that, in the present embodiment, the warmed state determining means is achieved by the CPU 34 executing the process of step 100 and 104 of the routine shown in FIG. 3. The vehicle stop determining means is achieved by the CPU 34 executing step 102 of the routine shown in FIG. 3. The sensor abnormality determining means is achieved by the CPU 34 executing the step 106 of the routine shown in FIG. 3.

A description will now be given of a second embodiment of the present invention. The system according to the present embodiment is the same as that of the system according to the above-mentioned first embodiment except for the CPU 34 performing a routine shown in FIG. 4 instead of the routine shown in FIG. 3 in the system structure shown in FIGS. 1 and 2.

Generally, when the engine is restarted in the completely warmed state, the intake air temperature is considered to be sufficiently increased. Thus, the intake air temperature is decreased with passage of time since the engine suctions atmospheric air after the restart of the completely warmed engine. Thus, in the present embodiment, if the intake air temperature when the engine is started is greater than a predetermined value, and if THA is not decreased when the quantity of intake air exceeds a predetermined amount, it is determined that the intake air temperature sensor 24 is abnormal.

Figure 4:
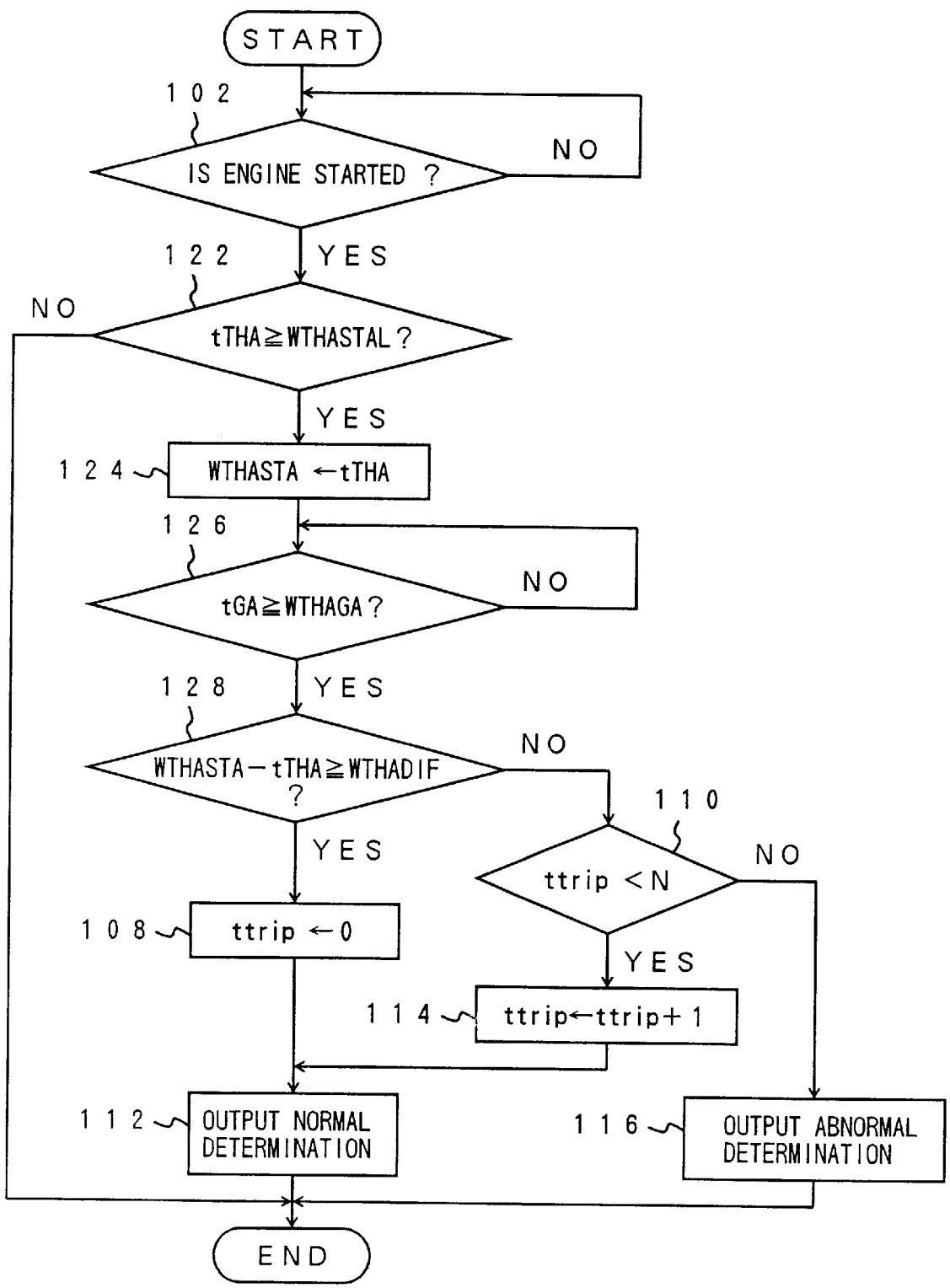
FIG. 4 is a flowchart of an abnormality determining process executed by a CPU in the second embodiment.

FIG. 4 is a flowchart of the routine executed by the CPU 34 for detecting an abnormality of the intake air temperature sensor in the present embodiment. In the routine shown in FIG. 4, steps that are the same as the steps in the routine shown in FIG. 3 are given the same reference numerals, and descriptions thereof will be omitted. It should be noted that the routine shown in FIG. 4 is executed immediately after the ignition switch is turned on.

In the routine shown in FIG. 4, if it is determined, in step 102, that the engine 10 is started, the process of step 122 is then executed. In step 122, it is determined whether or not a relationship tTHA≧WTHASTAL is established with respect to the present value tTHA of the intake air temperature THA. The parameter WTHASTAL is a threshold value of THA which is a reference value to determine whether or not the engine 10 is in a completely warmed state. Accordingly, if it is determined, in step 122, that the relationship tTHA≧WTHASTAL is established, it is determined that the engine 10 is in the completely warmed state, that is, it is possible to perform the determination of abnormality of the intake air temperature sensor 24. Thereafter, the abnormality determination process of the intake air temperature sensor 24 is performed in the step 124 and the subsequent steps. On the other hand, if it is determined, in step 122, that the relationship tTHA≧WTHASTAL is not established, it is determined that the engine is not in the completely warmed state, and thus it is not possible to perform the determination of abnormality of the intake air temperature sensor 24. Then, the routine is ended without execution of any process.

In step 124, the value tTHA is substituted for a parameter WTHASTA. Accordingly, the value of the intake air temperature THA at the time when the engine 10 is started is represented by the parameter WTHASTA. After the process of step 124 is completed, the process of step 126 is then executed. In step 126, it is determined whether or not a relationship tGA≧WTHAGA is established with respect to the present value tGA of the quantity GA of the intake air. The value WTHAGA is a predetermined threshold value which is a reference value to determine whether or not the quantity GA of the intake air is sufficiently large to decrease the intake air temperature THA. If it is determined, in step 126, that the relationship tGA≧WTHAGA is not established, it is determined that a sufficient quantity of air to decease THA has not been introduced. Thus, the process of step 126 is executed again. That is, the process of step 126 is repeated until the relationship tGA≧WTHAGA is established. On the other hand, if it is determined, in step 126, that the relationship tGA≧WTHAGA is established, it is determined that a sufficient quantity of air has been introduced to decrease THA, and then the process of step 128 is executed.

In step 128, it is determined whether or not a relationship (WTHASTA-tTHA)≧WTHADIF is established. The left side of the above-mentioned relationship represents a range of decrease in the intake air temperature after the engine 10 is started. The value WTHADIF is a predetermined threshold value which is a reference value to determine whether or not a substantial change is generated in the detected value of the intake air temperature sensor 24. Accordingly, if it is determined, in step 128, that the relationship (WTHASTA-tTHA)≧WTHADIF is established, this means that a decrease in the intake air temperature, after the start of the engine, has been detected. Thus, in this case, it is determined that the intake air temperature sensor 24 is normal, and the process of step 108 is then executed. On the other hand, if it is determined, in step 128, that the relationship (WTHASTA-tTHA)≧WTHADIF is not established, this means that a decrease in the intake air temperature, after the start of the engine, has not been detected. Thus, in this case, it is determined that an abnormality exists in the intake air temperature sensor 24, that is, the temporary abnormal determination is made. Thereafter, the process of step 110 and subsequent steps is executed.

As mentioned above, in the present embodiment, when the engine 10 is started in a state where the intake air temperature THA is high, the determination of abnormality of the intake air temperature sensor 24 is performed on the assumption that THA will be decreased by the atmospheric air suctioned by the engine 10. That is, in the present embodiment, the intake air temperature sensor 24 is abnormal when THA is not decreased despite the fact that the condition in which THA must be decreased is established. When an air flow due to movement of the vehicle enters the engine compartment as mentioned above, the air flow acts to decrease the intake air temperature. Accordingly, in the present embodiment, it can be determined that the intake air temperature sensor 24 is abnormal if THA does not decrease irrespective of whether the vehicle is moving or stopped. As mentioned above, according to the present invention, the detection of abnormality of the intake temperature sensor 24 can be performed with high reliability irrespective of whether the vehicle is moving or stopped.

It should be noted that when the bonnet is opened or a strong wind blowing into the engine compartment, the intake air temperature is decreased similar to the case in which the air flow enters due to movement of the vehicle. Thus, there is no influence to the determination of abnormality of the intake air temperature sensor 24. Accordingly, if the temporary abnormal determination is made in step 128 of the routine shown in FIG. 4, it can be determined that the possibility that an abnormality exists in the intake air temperature sensor 24 is high. Thus, in the present embodiment, if the number N of trips to perform the determination of abnormality is small, the possibility of an erroneous determination of abnormality is small. Accordingly, in the system according to the present embodiment, the number N of trips is set to a small value so that when the abnormality occurs in the intake air temperature sensor 24, the abnormality can be accurately and promptly detected.

It should be noted that, in the present embodiment, although the determination as to whether or not the intake air temperature THA is decreased in step 128 is delayed until the quantity tGA of the intake air exceeds the predetermined value in step 126, the present invention is not limited to this, and the determination may be performed after a predetermined time period has lapsed. That is, if the intake air temperature is sufficiently high at the start time of the engine 10, the intake air temperature is gradually decreased with respect to passage of time after the start of the engine 10 irrespective of the quantity of the intake air. Thus, determination of an abnormality of the intake air temperature sensor 24 can be accurately performed by determining whether or not THA is decreased after the start of the engine.

Additionally, in the present embodiment, although the determination of an abnormality of the intake air temperature sensor 24 is performed based on the change in THA after the start of the engine, the present invention is not limited to this, and the determination of abnormality may be performed based on a comparison of a predetermined value with THA at the time when the quantity GA of the intake air exceeds the predetermined value WTHAGA (or when a predetermined time period has passed) after the start of the engine. That is, the temporary abnormal determination may be made when THA is greater than a predetermined value in step 128 of the routine shown in FIG. 4.

It should be noted that the determination as to whether the engine 10 is in the completely warmed state may be performed based on the water temperature value obtained from the previous trip and the present trip similar to steps 100 and 104 of the routine according the above-mentioned first embodiment. However, it is possible that the intake air temperature has been decreased when a restart is performed in the completely warmed state if the bonnet is open or a strong wind blows into the engine compartment immediately after the engine 10 is stopped. In this case, an accurate determination of abnormality of the intake air temperature sensor 24 cannot be performed based on the value of THA after the restart of the engine. Thus, when the determination as to whether or not the engine is in the completely warmed state is performed based on the water temperature THW, the number N of trips must large enough so that an erroneous determination of abnormality of the intake air temperature sensor 24 is avoided. However, in the present embodiment, since the completely warmed state is determined based on THA, the determination that the engine is in the completely warmed state is not made when THA is decreased at the time of restart as mentioned above. Thus, in such a case, the abnormal determination process of the intake air temperature sensor 24 is not performed, and an erroneous determination of abnormality is not made. In this respect, the number N of trips can be set to a small number in the present embodiment.

It should be noted that the engine start detecting means is achieved by the CPU 34 executing the process of step 102 of the routine shown in FIG. 4. The warmed state determining means is achieved by the CPU 34 executing the process of step 122 of the routine shown in FIG. 4. Additionally, sensor abnormality determining means is achieved by the CPU 34 executing the process including steps 126 and 128 of the routine shown in FIG. 4.

A description will now be given of a third embodiment of the present invention. The system according to the present embodiment is the same as the system according to the above-mentioned first embodiment except for the CPU 34 execution of a routine shown in FIG. 5 in stead of the routine shown in FIG. 3 in the system structure shown in FIGS. 1 and 2.

Generally, when a cooling fan for cooling the coolant of a radiator is operated, heat accumulated in the radiator is released to the engine compartment. Accordingly, the temperature of the engine compartment is increased, and the intake air temperature is also increased. Thus, in the present embodiment, it is determined that the intake air temperature sensor 24 is abnormal if THA is not increased when the cooling fan is operated.

FIG. 5 is a flowchart of the routine performed by the CPU 34 for detecting an abnormality of the intake air temperature sensor. In the routine shown in FIG. 5, steps that are the same as the steps of the routine shown in FIG. 3 are given the same reference numerals, and descriptions thereof will be omitted. The routine of the present embodiment is performed immediately after the ignition switch is turned on.

When the routine shown in FIG. 5 is started, the process of step 130 is executed first. In step 130, it is determined whether or not the operation of the cooling fan is started. It should be noted that the operation of the cooling fan is started when the water temperature THW exceeds a predetermined value CF1, and is stopped when THW decreases below a predetermined value CF2 during the operation. Accordingly, the determination as to whether or not the operation of the cooling fan is started can be made by determining whether or not THW is greater than the predetermined value CF1. If it is determined, in step 130, that the operation of the cooling fan is not started, the process of step 130 is executed again. That is, the process of step 130 is repeated until the operation of the cooling fan is started. On the other hand, if it is determined, in step 130, that the operation of the cooling fan is started, the process of step 132 is executed.

In step 132, it is determined whether or not the cooling fan is stopped. This determination can be made by determining whether or not the water temperature THW is less than the above-mentioned predetermined value CF2. If it is determined, in step 132, that the cooling fan is not stopped, the process of step 132 is executed again. Accordingly, the process of step 132 is repeated until the cooling fan is stopped.

It should be noted that the temperature CF2 at which the cooling fan is stopped is set lower than the temperature CF1 at which the cooling fan is started. Thus, once the cooling fan is operated, the operation continues until the water temperature decreases from the temperature CF1 to the temperature CF2. That is, the cooling fan operates for a considerable time period from start to stop. Accordingly, at the time when the cooling fan is stopped in step 132, it can be determined that the heat accumulated in the radiator is sufficiently released to the engine compartment. In this case, it is determined that the intake air temperature THA is increased, and the process of step 134 is executed.

In step 134, it is determined whether or not a relationship (MaxTHA-MinTHA)≧WTHADIF is established. MaxTHA and MinTHA are the maximum value and the minimum value of the intake air temperature in the present trip, respectively. The CPU 34 starts to monitor THA at the time when the ignition switch is turned on so as to update MaxTHA and MinTHA. However, the maximum value and the minimum value of THA during operation of the cooling fan may be used instead of MaxTHA and MinTHA.

If it is determined, in step 134, that (MaxTHA-MinTHA) ≧WTHADIF is established, this means that a change in the intake air temperature due to the operation of the cooling fan is detected by the intake air temperature sensor 24. Accordingly, in such a case, it is determined that the intake air temperature sensor is normal, and then the process of step 108 is executed. On the other hand, if it is determined, in step 134, that the relationship (MaxTHA-MinTHA)

≧WTHADIF is not established, this means that a change in the intake air temperature due to the operation of the cooling fan is not detected by the intake air temperature sensor 24. Accordingly, in such a case, it is determined that there is a possibility that an abnormality exists in the intake air temperature sensor 24. That is, the temporary abnormal determination is made, and then the process of step 110 is executed.

As mentioned above, in the present embodiment, the cooling fan releases heat accumulated in the radiator to the engine compartment. Thus, if the vehicle is moving, that is if an air flow enters the engine compartment, the air temperature in the engine compartment is increased when the cooling fan is operated, and the intake air temperature is positively increased. Accordingly, if the intake air temperature THA is not increased even if the vehicle is moving, it can be determined that the intake air temperature sensor 24 is abnormal. As mentioned above, in the present embodiment, an accurate determination of abnormality of the intake air temperature sensor 24 can be performed irrespective of whether the vehicle is stopped or moving. Thereby, the determination of abnormality of the intake air temperature sensor 24 can be performed with high reliability.

For the same reason, when the bonnet is opened or a strong wind blows into the engine compartment, the intake air temperature is positively increased when the cooling fan is operated. Accordingly, when the temporary abnormal determination is made in step 134 of the routine shown in FIG. 5, is can be determined that there is a high possibility that an abnormality exists in the intake air temperature sensor 24. Thus, according to the present embodiment, when an abnormality occurs in the intake air temperature sensor 24, the abnormality can be detected promptly and accurately by setting the number N to a small value.

Additionally, when the engine 10 is in the completely warmed state, the water temperature THW is high, and thus the cooling fan is always operated. Accordingly, in the present embodiment, the determination of an abnormality of the intake air temperature sensor 24 can be performed absent a condition where the intake air temperature is greater than a predetermined value as in the above-mentioned second embodiment. That is, in the system according to the present embodiment, more frequent checks for a determination of an abnormality of the intake air temperature sensor 24 can be performed since the condition to perform the determination of abnormality is relaxed. Thereby, when an abnormality occurs in the intake air temperature sensor 24, the abnormality can be promptly detected.

In the present embodiment, since detection of start and stop operations of the cooling fan is performed based on the water temperature THW, there is no need to provide an additional sensor to detect operation of the fan. Accordingly, in the system of the present embodiment, the above-mentioned operation can be achieved without increasing cost. It should be noted that a power switch of the cooling fan may be connected to the ECU 3 so that the detection of start and stop operations of the cooling fan is based on the status of the switch.

In the present embodiment, the determination of an abnormality of the intake air temperature sensor 24 is made at the time the cooling fan is stopped after it has operated. However, the present invention is not limited to this method, and the determination of an abnormality may be made when a predetermined time period is passed after operation of the cooling fan was started. That is, the abnormality determination process can be performed when heat of the radiator is sufficiently released to the engine compartment.

Additionally, in the present embodiment, the determination of an abnormality of the intake air temperature sensor 24 is made based on the amount of change in the intake air temperature THA which is related to operation of the cooling fan. However, the present invention is not limited to this method, and the determination of an abnormality of the intake air temperature sensor 24 may be made based on a comparison between a predetermined value and the intake air temperature THA at the time when the cooling fan is stopped or when a predetermined time period has passed after the start of the cooling fan. That is, the determination of an abnormality of the intake air temperature sensor 24 may be made if THA is greater than the predetermined value when the cooling fan is stopped or when a predetermined time period has passed after the start of the cooling fan.

In the above-mentioned third embodiment, the cooling fan start detecting means is achieved by the CPU 34 executing the process of step 130 of the routine shown in FIG. 5, and the sensor abnormality determining means is achieved by the CPU 34 executing the process including step 134 of the routine shown in FIG. 5.

It should be noted that the present application may be applied to detection of an abnormality of an air temperature sensor, such as an atmospheric temperature sensor for an air conditioner, which detects air temperature in an engine compartment other than the intake air temperature sensor. Additionally, the CPU 34 may selectively perform one of the routines shown in FIGS. 3 to 5. Also, the CPU 34 may perform more than two routines so as to further improve the reliability of the determination of abnormality.

The present invention is not limited to the specifically disclosed embodiments, and variations and modifications may be made without departing from the scope of the present invention.

What is claimed is:

1. An abnormality detecting apparatus for detecting an abnormality of an air temperature sensor which detects a temperature of air in an engine compartment of a vehicle, said abnormality detecting apparatus comprising:

warmed state determining means for determining whether an engine in said engine compartment is in a predetermined warmed state;

vehicle stop determining means for determining whether said vehicle is stopped; and sensor abnormality determining means for determining whether said air temperature sensor is abnormal based on a detected temperature of said air temperature sensor, a determination of said sensor abnormality determining means being performed when said warmed state determining means determines that said engine is in the predetermined warmed state and said vehicle stop determining means determines that said vehicle is stopped.

2. The abnormality detecting apparatus as claimed in claim 1, wherein a determination of said warmed state determining means is performed based on a temperature of a coolant of said engine.

3. The abnormality detecting apparatus as claimed in claim 2, wherein said warmed state determining means determines that said engine is in said predetermined warmed state when the temperature of the coolant exceeded a predetermined temperature in a previous operation of said engine and when a present temperature of the coolant is within a predetermined range.

4. The abnormality detecting apparatus as claimed in claim 1, wherein said vehicle stop determining means determines that said vehicle is stopped by said engine being started.

5. The abnormality detecting apparatus as claimed in claim 1, wherein said sensor abnormality determining means determines that said air temperature sensor is abnormal when a difference between the air temperature detected by said air temperature sensor and a predetermined minimum temperature is less than a predetermined value.

6. The abnormality detecting apparatus as claimed in claim 1, wherein the determination of abnormality of said air temperature sensor is output when the determination that said air temperature sensor is abnormal is made for a predetermined number of consecutive times.

7. An abnormality detecting apparatus for detecting an abnormality of an air temperature sensor which detects a temperature of air in an engine compartment of a vehicle, said abnormality detecting apparatus comprising:

warmed state determining means for determining whether an engine in said engine compartment is in a predetermined warmed state;

engine start detecting means for detecting a start of said engine; and sensor abnormality determining means for determining whether said air temperature sensor is abnormal based on a change in a temperature detected by said air temperature sensor during a predetermined time period after the start of said engine, a determination of said sensor abnormality determining means being performed when the start of said engine is detected by said engine start detecting means and when said warmed state determining means determines that said engine is in the predetermined warmed state.

8. The abnormality detecting apparatus as claimed in claim 7, wherein said warmed state determining means determines that said engine is in the predetermined warmed state when the temperature detected by said air temperature sensor is greater than a predetermined temperature.

9. The abnormality detecting apparatus as claimed in claim 7, wherein said sensor abnormality determining means determines that said air temperature sensor is abnormal when a difference between the temperature detected by said air temperature sensor when said engine is started and the temperature at a present time is less than a predetermined value.

10. The abnormality detecting apparatus as claimed in claim 7, wherein the determination of abnormality of said air temperature sensor is output when the determination that said air temperature sensor is abnormal is made for a predetermined number of consecutive times.

11. An abnormality detecting apparatus for detecting an abnormality of an air temperature sensor which detects a temperature of air in an engine compartment of a vehicle, said abnormality detecting apparatus comprising:

cooling fan start detecting means for detecting a start of a cooling fan; and sensor abnormality determining means for determining whether said air temperature sensor is abnormal based on a change in a temperature detected by said air temperature sensor after the start of said cooling fan is detected by said cooling fan start detecting means.

12. The abnormality detecting apparatus as claimed in claim 11, wherein a determination of said sensor abnormality determining means is performed when a predetermined period has passed after said cooling fan is started.

13. The abnormality detecting apparatus as claimed in claim 12, wherein said predetermined period is from a time when said cooling fan is started until a time when said cooling fan is stopped.

14. The abnormality detecting apparatus as claimed in claim 11, wherein said sensor abnormality determining means determines that said air temperature sensor is abnormal when a difference between a maximum temperature detected by said air temperature sensor and a minimum temperature detected by said air temperature sensor is less than a predetermined value.

15. The abnormality detecting apparatus as claimed in claim 14, wherein said maximum temperature and said minimum temperature are detected during a predetermined period from the time when said cooling fan is started until the time when said cooling fan is stopped.

16. The abnormality detecting apparatus as claimed in claim 11, wherein the determination of abnormality of said air temperature sensor is output when the determination that said air temperature sensor is abnormal is made for a predetermined number of consecutive times.

* * * * *

UNITED STATES PATENT AND TRADEMARK OFFICE
CERTIFICATE OF CORRECTION

PATENT NO. : 5,880,361
DATED : March 9, 1999
INVENTOR(S) : Satoru TANIGUCHI

It is certified that error appears in the above-identified patent and that said Letters Patent is hereby corrected as shown below:

Column 1, line 8, change "a abnormality" to --an abnormality--.

Column 1, line 17, change "electronic" to --electronically--

Column 1, line 49, change "against" to --head--.

Column 1, line 67, change "against" to --head--.

Column 3, line 34, insert --in a-- before "sufficiently--.

Column 4, line 28, change "embedment" to --embodiment--.

Column 5, line 6, change "converter 14" to --converter 17--.

Column 7, line 46, after "Thus" insert --it--.

Column 7, line 64, change "that fact" to --the fact--.

Column 9, line 63, change "decease" to --decrease--.

Column 11, line 26, after "according" insert --to--.

UNITED STATES PATENT AND TRADEMARK OFFICE
CERTIFICATE OF CORRECTION

PATENT NO. : 5,880,361
DATED : March 9, 1999
INVENTOR(S) : Satoru TANIGUCHI

It is certified that error appears in the above-identified patent and that said Letters Patent is hereby corrected as shown below:

Column 11, line 61, change "in stead" to --instead--.

Column 13, line 31, change "is can be" to --it can be--.

Signed and Sealed this

Fourth Day of January, 2000

Attest:

Attesting Officer

*Acting Commissioner of Patents and Trademarks*